United States Patent
Richter et al.

(10) Patent No.: US 11,133,653 B2
(45) Date of Patent: Sep. 28, 2021

(54) GAS-INSULATED LINE, GAS-INSULATED SWITCHGEAR AND METHOD THEREOF

(71) Applicant: ABB Power Grids Switzerland AG, Baden (CH)

(72) Inventors: Markus Richter, Zürich (CH); HongBing Liao, Xiamen (CN); Juerg Bryner, Zürich (CH); Markus Keller, Buchs (CH)

(73) Assignee: ABB Power Grids Switzerland AG, Baden (CH)

( * ) Notice: Subject to any disclaimer, the term of this patent is extended or adjusted under 35 U.S.C. 154(b) by 18 days.

(21) Appl. No.: 16/665,560

(22) Filed: Oct. 28, 2019

(65) Prior Publication Data

US 2020/0067285 A1 Feb. 27, 2020

Related U.S. Application Data

(63) Continuation of application No. PCT/CN2017/083455, filed on May 8, 2017.

(51) Int. Cl.
| | |
|---|---|
| *H02B 13/00* | (2006.01) |
| *H02B 13/045* | (2006.01) |
| *H02G 5/06* | (2006.01) |
| *H02B 13/035* | (2006.01) |

(52) U.S. Cl.
CPC .......... *H02B 13/045* (2013.01); *H02G 5/063* (2013.01); *H02B 13/0358* (2013.01)

(58) Field of Classification Search
None
See application file for complete search history.

(56) References Cited

U.S. PATENT DOCUMENTS

| | | | |
|---|---|---|---|
| 5,006,958 A | | 4/1991 | Sasamori et al. |
| 5,057,655 A | * | 10/1991 | Kersusan ............. H01H 33/982 218/76 |
| 10,643,764 B2 | * | 5/2020 | Biquez ..................... H01B 3/56 |

(Continued)

FOREIGN PATENT DOCUMENTS

| | | |
|---|---|---|
| CN | 1044739 A | 8/1990 |
| CN | 101902020 A | 12/2010 |

(Continued)

OTHER PUBLICATIONS

Chinese Office Action and Search Report dated May 7, 2020 for Chinese Patent Application No. 201780090105.2, 5 pages.

(Continued)

*Primary Examiner* — Courtney L Smith
(74) *Attorney, Agent, or Firm* — Sage Patent Group

(57) ABSTRACT

A gas-insulated line is provided. The gas-insulated line defines an axial direction and includes an enclosure configured to surround a nominal conductor and a pressurized insulation gas in the enclosure, wherein the enclosure includes: a first attachment point and a second attachment point, the first attachment point and the second attachment point being spaced apart from each other in the axial direction; a rope element fixed between the first attachment point and the second attachment point and loaded with a pretension; and a flexible enclosure element arranged between the first attachment point and the second attachment point.

21 Claims, 2 Drawing Sheets

(56) References Cited

U.S. PATENT DOCUMENTS

| | | | | |
|---|---|---|---|---|
| 2010/0219163 A1* | 9/2010 | Holaus | | H01H 33/16 218/143 |
| 2011/0290624 A1* | 12/2011 | Wurgler | | H01H 1/62 200/293 |
| 2012/0006665 A1 | 1/2012 | Sologuren-Sanchez et al. | | |
| 2012/0256711 A1* | 10/2012 | Liljestrand | | H01H 50/323 335/1 |
| 2015/0236485 A1* | 8/2015 | Hashimoto | | H02B 5/06 361/618 |
| 2015/0240112 A1* | 8/2015 | Hulteen | | C09D 163/00 428/418 |

FOREIGN PATENT DOCUMENTS

| | | |
|---|---|---|
| CN | 102782972 A | 11/2012 |
| CN | 102823095 A | 12/2012 |
| CN | 103124050 A | 5/2013 |
| CN | 101902020 B | 7/2013 |
| CN | 103339811 A | 10/2013 |
| DE | 102011086663 A1 | 5/2013 |
| FR | 2443756 A1 | 7/1980 |
| JP | H0630519 A | 2/1994 |
| JP | H08331714 A | 12/1996 |
| JP | H0965525 A | 3/1997 |
| JP | 2000312423 A | 11/2000 |
| KR | 20120010542 A | 2/2012 |

OTHER PUBLICATIONS

Intellectual Property Office of the P.R. China, International Search Report & Written Opinion issued in corresponding Application No. PCT/CN2017/083455, dated Jan. 29, 2018, 12 pp.

Extended European Search Report dated Nov. 16, 2020 for European Patent Application No. 17909067.5, 5 pages.

Examination Report dated Jul. 16, 2020 for Indian Patent Application No. 201947043668, 6 pages.

\* cited by examiner

GAS-INSULATED LINE, GAS-INSULATED SWITCHGEAR AND METHOD THEREOF

FIELD

The present application relates to a gas-insulated line, a gas-insulated switchgear and a method thereof, and specifically to a gas-insulated line and a gas-insulated switchgear in which a force that is generated by a gas pressure of a pressurized insulation gas in the gas-insulated line along an axial direction is at least partially compensated particularly by rope elements as well as a method for compensating at least partially a force that is generated by a gas pressure of a pressurized insulation gas in a gas-insulated line along an axial direction particularly by using rope elements.

BACKGROUND

Gas-insulated lines are a safe and flexible alternative to overhead lines and take up much less space while providing the same power transmission. They are suitable for providing a continuation for overhead lines underground, connecting power stations to the power network, or as a space-saving way to connect major industrial plants to the public grid.

The gas-insulated lines include a nominal conductor that is typically glidingly supported in an enclosure of the gas-insulated line. The enclosure is filled with an insulating gas under pressure. Hence, the pressurized insulation gas creates a force that may act on a flexible element, such as a bellow, provided in the enclosure. To compensate this force a spring can be provided across the bellow. However, spring providing the necessary force over the typical length change of the bellow are relative short. On the one hand, a length of the bellow is thereby limited to the even to below the length of the spring. On the other hand, for considerable long gas-insulated lines a large amount of springs is needed.

SUMMARY

The above-mentioned shortcomings, disadvantages and problems are addressed herein which will be understood by reading and understanding the following specification. Specifically, the present disclosure outlines a cost efficient and reliable gas-insulated line, a gas-insulated switchgear and a method thereof.

According to an aspect, a gas-insulated line is provided. The gas-insulated line defines an axial direction and includes an enclosure configured to surround a nominal conductor and a pressurized insulation gas in the enclosure. The enclosure includes a first attachment point and a second attachment point. The first attachment point and the second attachment point are spaced apart from each other in the axial direction. The enclosure further includes a rope element fixed between the first attachment point and the second attachment point and loaded with a pretension. Furthermore, the enclosure includes a flexible enclosure element arranged between the first attachment point and the second attachment point.

According to embodiments, the rope element can be configured to at least partially compensate a force that is generated by the gas pressure of the pressurized insulation gas along the axial direction. Specifically, the force generated by the pretension of the rope element can correspond to the force generated by the gas pressure of the pressurized gas in the enclosure along the axial direction, e.g. within a margin of ±20%. For example, the rope element can be loaded with a pretension that corresponds to the force generated by the gas pressure of the pressurized insulation gas along the axial direction within a margin of ±20%.

According to embodiments, the rope element can be a steel wire rope or carbon fiber rope or of any other suitable material.

According to embodiments, the rope element can be configured to act as a long tension spring.

According to embodiments, the rope element can have an axial stiffness that is configured such that a force generated by the pressurized insulation gas is fully or at least partially compensated. For example, the rope element can have a Young's modulus of equal to or more than 50 kN/mm$^2$, specifically equal to or more than 75 kN/mm$^2$, and/or equal to or less than 200 kN/mm$^2$, specifically equal to or more than 150 kN/mm$^2$.

According to embodiments, the rope element can be arranged outside of the enclosure.

According to embodiments, flexible enclosure element can be configured to compensate a thermal deformation of the enclosure.

According to embodiments, a distance between the first attachment point and the second attachment point can be equal to or greater than 20 m, specifically equal to or greater than 30 m, particularly equal to or greater than 40 m, and/or equal to or less than 100 m, specifically equal to or less than 80 m, particularly equal to or less than 60 m. For instance, the distance between the first attachment point and the second attachment point can be approximately 50 m.

According to an aspect, a gas-insulated switchgear is provided. The gas-insulated switchgear includes a gas-insulated line. The gas-insulated line defines an axial direction and includes an enclosure configured to surround a nominal conductor and a pressurized insulation gas in the enclosure. The enclosure includes a first attachment point and a second attachment point. The first attachment point and the second attachment point are spaced apart from each other in the axial direction. The enclosure further includes a rope element fixed between the first attachment point and the second attachment point and loaded with a pretension. Furthermore, the enclosure includes a flexible enclosure element arranged between the first attachment point and the second attachment point.

According to embodiments, the gas-insulated switchgear can be rated for voltages of 72.5 kV to 1200 kV.

According to embodiments, the gas-insulated line can be configured as an exit line of the gas-insulated switchgear.

According to embodiments, the gas-insulated line can be configured as a bus duct of the gas-insulated switchgear.

According to embodiments, the gas-insulated switchgear further includes least one module arranged between the first attachment point and the second attachment point in the axial direction.

According to an aspect, a method for compensating at least partially a force that is generated by a gas pressure of a pressurized insulation gas in a gas-insulated line along an axial direction is provided. The method includes providing a gas-insulated line defining the axial direction and including an enclosure configured to surround a nominal conductor and a pressurized insulation gas in the enclosure and including a flexible enclosure element arranged between the first attachment point and the second attachment point. A rope element is fixed between a first attachment point and a second attachment point with a pretension. A pressurized gas is provided in the enclosure.

Embodiments are also directed at apparatuses for carrying out the disclosed methods and include apparatus parts for performing each described method aspect. These method aspects may be performed by way of hardware components, a computer programmed by appropriate software, by any combination of the two or in any other manner. Furthermore, embodiments according to the disclosure are also directed at methods for operating the described apparatus. The methods for operating the described apparatus include method aspects for carrying out functions of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments of the disclosure, one or more examples of which are illustrated in the figures. Within the following description of the drawings, the same reference numbers refer to same components. Typically, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations. Unless otherwise stated herein, a percentage for a specific element in a chemical composition shall refer to a mass percentage of that element in the chemical composition.

Figure 1:
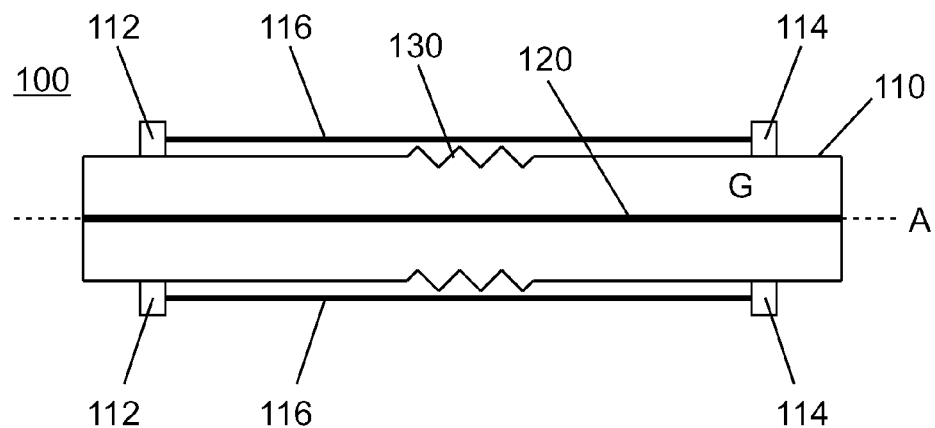
FIG. 1 shows a schematic view of a gas-insulated line.

FIG. 1 shows a gas-insulated line 100 according to embodiments describes herein. The gas-insulated line 100 may define an axial direction X. The gas-insulated line 100 may include an enclosure 110 that may be configured to surround a nominal conductor 120. The gas-insulated line 100 may include a pressurized insulation gas G in the enclosure 110. In particular, pressurized insulation gas G may surround the nominal conductor 120 within the enclosure 110. The insulation gas G can be, e.g., SF6 or any other suitable dielectric gas.

The gas-insulated line 100 may further include a flexible enclosure element 130. For example, the enclosure 110 may undergo deformations, e.g. due to thermal expansion. According to embodiments described herein, the flexible enclosure element 130 can be configured to compensate for thermal deformation of the enclosure 110. Accordingly, when the enclosure 110 e.g. increase in a length along the axial direction X, the flexible enclosure element 130 can be shorten along the actual direction X to compensate for this change of the length of the enclosure 110 along the axial direction X. Likewise, when the enclosure 110 decreases in a length along the axial direction X, the flexible enclosure element 130 can be lengthen along the actual direction X to compensate for this change of the length of the enclosure 110 along the axial direction X. For instance, the flexible enclosure element 130 may be below or any other suitable flexible element.

When the insulation gas G is filled under a pressure, such as 5 bar, into the enclosure 110, a force may be generated that acts on the flexible enclosure element 130 and stresses the flexible enclosure element 130 to increase in size along the axial direction X Accordingly, the gas-insulated line 100 may be put on under a prestress when the insulation gas G is filled under pressure into the enclosure 110.

To particularly compensate for this prestress, a rope element 116 may be provided. The rope element 116 can be fixed between a first attachment point 112 and a second attachment point 114. The first attachment point 112 and the second attachment point may be spaced apart from each other in the axial direction X. Further, the flexible enclosure element 130 can be arranged between the first attachment point 112 and the second attachment point 114.

According to embodiments described herein, the rope element 116 can be loaded with a pretension. Accordingly, the rope element 116 may provide a force that acts against a force that is generated by the gas pressure of the pressurized insulation gas G. For instance, the pretension can be loaded onto the rope element 116 by using a hydraulic pretension device in which the rope element 116 can be loaded.

According to embodiments described herein, the rope element 116 can be configured to at least partially compensate a force that is generated by the gas pressure of the pressurized insulation gas G along the axial direction X. Specifically, the force generated by the pretension of the rope element 116 can correspond to the force generated by the gas pressure of the pressurized gas G in the enclosure 110 along the axial direction X, e.g. within a margin of ±20%. For example, the rope element 116 can be loaded with a pretension that corresponds to the force generated by the gas pressure of the pressurized insulation gas G along the axial direction X, e.g. within a margin of ±20%. When practicing embodiments, a gas-insulated line can be provided that is not preloaded with a reactive force and/or that is force balanced.

Specifically, the rope element 116 may be considered as acting like a long tension spring. Springs rated for the expected force-length relation are shorter and/or cannot provide a linear spring constant over the expected length change. As the rope element 116 can be formed longer while providing the desired force-length relation, less pieces of rope elements 116 and less fixation points are needed. When practicing embodiments, the number of parts needed per unit length along the axial direction can be lowered.

Further, the rope elements 116 may also be beneficial over rods used for compensating a force of the pressurized gas. In particular, rods that may be used therefor cannot be formed with the desired length. Rather, small pieces of rods would be needed to be screwed together, deteriorating the expected force-length relation (i.e. making it less linear) and making the assembly process more complicated. Furthermore, specifically due to loading the rope element with a pretension, the force can be balanced more precise/accurate. In particular, a degree of freedom may be gained for adapting the rope element to the gas-insulated line. When practicing embodiments, the number of parts needed per unit length along the axial direction can be lowered and/or accuracy of force control may be increased.

According to embodiments described herein, the rope element 116 can be a steel wire rope or carbon fiber rope. A steel wire rope may be considered as including or consisting of several strands of steel wire laid (twisted) into a helix. A steel wire rope may provide in practice an advantage of low cost and high reliability. A carbon fiber rope may be considered as rope that includes or consist of several strands of carbon fibers laid (twisted) into a helix and/or as a rope this is reinforced by carbon fibers. A carbon fiber rope may provide in practice an advantage of high tensile strength. Further, the rope element 116 can be formed of any other suitable material.

According to embodiments described herein, the rope element 116 can have an axial stiffness that is configured such that a force generated by the pressurized insulation gas G is fully or at least partially compensated. In this context, an "axial" stiffness of the rope element 116 can be understood as a stiffness along the length of the rope element. While in practice a rope element, such as the rope element 116, has a 3-dimensional shape, a rope element may be considered as a one dimensional element for stiffness considerations in theory. Accordingly, the axial stiffness can be considered as the stiffness of the rope element 116. For example, the rope element can have a Young's modulus of equal to or more than 50 kN/mm$^2$, specifically equal to or more than 75 kN/mm$^2$, and/or equal to or less than 200 kN/mm$^2$, specifically equal to or more than 150 kN/mm$^2$. During production, samples of the rope elements may be tested routinely and rated by a manufacture of the rope elements. In practice, the rope element 116 can have a diameter of equal to or larger than 5 mm, specifically equal to or larger than 10 mm, and/or equal to or smaller than 30 mm, specifically equal to or smaller than 20 mm.

Specifically, while one rope element 116 is describes above, the gas-insulated line 100 may include a plurality of rope elements 116. FIG. 1 shows two rope elements 116 that are provided between the first attachment point 112 and the second attachment point 114. In this case, the two rope elements 116 can be arranged opposite to each other with respect to the enclosure 110 and/or the nominal conductor 120. Specifically, any number of rope elements 116 can be provided. The plurality of rope elements 116 can be provided circumferentially around the enclosure 110 and/or the nominal conductor 120. In the case of plurality of rope elements 116 the rope elements 116 in common, i.e. the sum of all rope elements 116, may have a Young's modulus as described herein. Accordingly, a rope element 116 having a Young's modulus of 100 kN/mm$^2$ can be replaced by two rope elements 116 each having a Young's modulus of 50 kN/mm$^2$. Further, a rope element 116 having a diameter of 20 mm may be replaced by two rope elements each having a diameter of 10 mm.

According to embodiments described herein, a distance between the first attachment point and the second attachment point is equal to or greater than 20 m, specifically equal to or greater than 30 m, particularly equal to or greater than 40 m, and/or equal to or less than 100 m, specifically equal to or less than 80 m, particularly equal to or less than 60 m, and/or wherein a distance between the first attachment point and the second attachment point is approximately 50 m.

According to embodiments described herein, the rope element 116 can be arranged outside of the enclosure 110. In the context of the present disclosure, "outside of the enclosure" can be understood as not being in contact with the insulation gas G. Accordingly, the rope element 116 can be arranged such as not to be in contact with the insulation gas G. On the other hand, the rope element 116 being arranged outside of the enclosure 110 may include configurations in which the rope element 116 traverses through an element, e.g. a flange, provided at an outer surface of the enclosure, which may be a part of the enclosure 110. Hence, unless stated otherwise, the rope element 116 being arranged outside of the enclosure 110 can also encompass configurations in which the rope element 116 traverses through parts of the enclosure 110 that are arranged on an outer surface of the enclosure and/or are not in contact with the insulation gas G.

For instance, the first attachment point 112 and/or the second attachment point 114 can be provided as flanges of the enclosure and the rope element 116 may traverse through a part of the first attachment point 112 and/or the second attachment point 114. Nonetheless, the rope element 116 can be considered as being arranged outside of the enclosure 110. Additionally or alternatively, the first attachment point 112 and/or the second attachment point 114 can be part of a scaffold or rack that is attached or fixed to the enclosure. Accordingly, a closed linkage between the rope element 116 and the enclosure 116 can be provided via the scaffold or rack.

Figure 2:
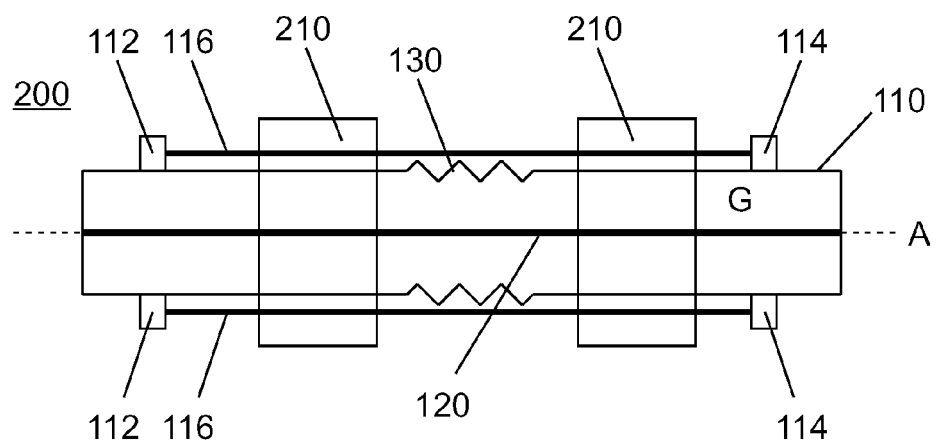
FIG. 2 shows a schematic view of a gas-insulated switchgear.

FIG. 2 shows a gas-insulated switchgear 200 according to embodiments described herein. The gas-insulated switchgear 200 may include the gas-insulated line described herein.

The gas-insulated switchgear 200 may be understood as the combination of electrical disconnect switches, fuses or circuit breakers used to control, protect and isolate electrical equipment. Accordingly, the gas-insulated switchgear 200 may include electrical disconnect switches, fuses and/or circuit breakers. In practice, the gas-insulated switchgear 200 may be used to protect electrical power stations and/or distribution systems by interrupting electric currents, when tripped by a protective relay. Further, the gas-insulated switchgear 200 may be realized as a compact metal encapsulated switchgear consisting of and/or including high-voltage components such as circuit-breakers and disconnectors, which can be safely operated in confined spaces. The gas-insulated switchgear 200 can be used where space is limited, for example, extensions, in city buildings, on roofs, on offshore platforms, industrial plants and hydro power plants. For instance, the gas-insulated switchgear 200 and/or the gas-insulated line 100 can be rated for voltages of 72.5 kV to 1200 kV.

As shown in FIG. 2, the gas-insulated switchgear 200 can include least one module 210 arranged between the first attachment point 114 and the second attachment point 116 in the axial direction X. The module 210 can be, e.g., a substation, a part of a substation, and/or a bay of a substation and the like.

The gas-insulated line 100 can be used as or fulfill different functions of the gas-insulated switchgear 200. For instance, the gas-insulated line 100 can be used to connect a power station to the gas-insulated switchgear 200. According to embodiments described herein, the gas-insulated line 100 can be configured as an exit line of the gas-insulated switchgear 200. Further, the gas-insulated line 100 can be configured as a bus duct of the gas-insulated switchgear 200. In a practical example, new layouts, e.g. for exit lines to a bushing, may be enabled. In particular, straight lines from a building to the bushings may be realized. Often a turn of e.g. 90° may be needed in conventional systems for length compensation, which may not be necessary with devices and systems according to the present disclosure.

According to embodiments described herein, the gas-insulated line 100 and/or the gas-insulated switchgear 200 can further include a network interface for connecting the gas-insulated line 100 and/or the gas-insulated switchgear 200 to a data network, in particular a global data network. The data network can be a TCP/IP network such as Internet. The gas-insulated line 100 and/or the gas-insulated switchgear 200 can be operatively connected to the network interface for carrying out commands received from the data network. The commands can include a control command for controlling the device to carry out a task such as switching the gas-insulated switchgear 200. In this case, the gas-insulated line 100 and/or the gas-insulated switchgear 200 can be configured for carrying out the task in response to the control command. Further, the commands can include a status request. In this case, the gas-insulated line 100 and/or the gas-insulated switchgear 200 can be configured for sending a status information to the network interface, and the network interface can be adapted for sending the status information over the network in response to the status request. The commands can include an update command including update data. In this case, the gas-insulated line 100 and/or the gas-insulated switchgear 200 can be adapted for initiating an update in response to the update command and using the update data.

Figure 3:
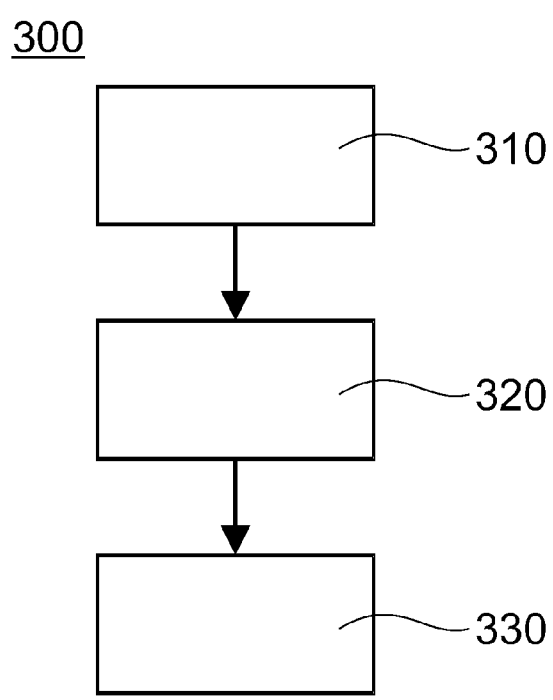
FIG. 3 shows a flowchart of a method.

FIG. 3 shows a flowchart of a method 300 for at least partially compensating a force that is generated by a gas pressure of a pressurized insulation gas G in a gas-insulated line 100 along an axial direction X.

According to block 310, a gas-insulated line 100 can be provided. The gas-insulated line 100 may define the axial direction X The gas-insulated line 100 may include an enclosure 110 that may be configured to surround a nominal conductor 120 and/or a pressurized insulation gas G in the enclosure 110. The gas-insulated line 100 may further include a flexible enclosure element 130 that may be arranged between the first attachment point 112 and the second attachment point 114. The gas-insulated line 100 can be a gas-insulated line as described herein.

According to block 320, a rope element 116 can be fixed between the first attachment point 112 and the second attachment point 114 with a pretension. According to block 330, a pressurized gas G can be provided in the enclosure 110. The rope element 116 can at least partially compensating the force generated by the gas pressure acting in the flexible enclosure element 130.

While the foregoing is directed to embodiments of the disclosure, other and further embodiments of the disclosure may be devised without departing from the basic scope thereof, and the scope thereof is determined by the claims that follow.

The invention claimed is:

1. A gas-insulated line defining an axial direction and comprising an enclosure configured to surround a nominal conductor and a pressurized insulation gas in the enclosure, wherein the enclosure includes:
   a first attachment point and a second attachment point, the first attachment point and the second attachment point being spaced apart from each other in the axial direction and arranged on the outside of the enclosure;
   a rope element fixed between the first attachment point and the second attachment point and loaded with a pretension, wherein the rope element is arranged outside of the enclosure; and
   a flexible enclosure element of the enclosure arranged between the first attachment point and the second attachment point.

2. The gas-insulated line according to claim 1, wherein the rope element is configured to at least partially compensate a force that is generated by the gas pressure of the pressurized insulation gas along the axial direction.

3. The gas-insulated line according to claim 2, wherein the force generated by the pretension of the rope element corresponds to a force generated by the gas pressure of the pressurized gas in the enclosure along the axial direction.

4. The gas-insulated line according to claim 1, wherein the rope element is a steel wire rope or carbon fiber rope.

5. The gas-insulated line according to claim 1, wherein the rope element is configured to act as a long tension spring.

6. The gas-insulated line according to claim 1, wherein the rope element has an axial stiffness that is configured such that a force generated by the pressurized insulation gas is fully or at least partially compensated.

7. The gas-insulated line according to claim 1, wherein the flexible enclosure element is configured to compensate for thermal deformation along the axial direction of the enclosure.

8. The gas-insulated line according to claim 1, wherein a distance between the first attachment point and the second attachment point is at least one selected from the group consisting of equal to or greater than 20 m, equal to or greater than 30 m, equal to or greater than 40 m, equal to or less than 100 m, equal to or less than 80 m, and equal to or less than 60 m.

9. A gas-insulated switchgear, comprising:
   a gas-insulated line defining an axial direction and comprising an enclosure configured to surround a nominal conductor and a pressurized insulation gas in the enclosure, wherein the enclosure includes:
      a first attachment point and a second attachment point, the first attachment point and the second attachment point being spaced apart from each other in the axial direction and arranged on the outside of the enclosure;
      a rope element fixed between the first attachment point and the second attachment point and loaded with a pretension, wherein the rope element is arranged outside of the enclosure; and
      a flexible enclosure element of the enclosure arranged between the first attachment point and the second attachment point.

10. The gas-insulated switchgear according to claim 9, wherein the gas-insulated switchgear is rated for voltages of 72.5 kV to 1200 kV.

11. The gas-insulated switchgear according to claim 9, wherein the gas-insulated line is configured as an exit line of the gas-insulated switchgear.

12. The gas-insulated switchgear according to claim 9, wherein the gas-insulated line is configured as a bus duct of the gas-insulated switchgear.

13. The gas-insulated switchgear according to claim 12, further comprising:
   at least one module arranged between the first attachment point and the second attachment point in the axial direction.

14. A method for compensating at least partially a force that is generated by a gas pressure of a pressurized insulation gas in a gas-insulated line along an axial direction, the method comprising:
   providing a gas-insulated line defining the axial direction and comprising an enclosure configured to surround a nominal conductor and a pressurized insulation gas in the enclosure and including a flexible enclosure element of the enclosure arranged between a first attachment point and a second attachment point that are arranged on the outside of the enclosure;
   fixing a rope element between the first attachment point and the second attachment point with a pretension, wherein the rope element is fixed outside of the enclosure; and
   providing a pressurized gas in the enclosure.

15. The gas-insulated line according to claim 1, wherein a distance between the first attachment point and the second attachment point is approximately 50 m.

16. The gas-insulated switchgear according to claim 9, wherein the rope element of the gas-insulated line is configured to at least partially compensate a force that is generated by the gas pressure of the pressurized insulation gas along the axial direction.

17. The gas-insulated switchgear according to claim 16, wherein the force generated by the pretension of the rope element corresponds to a force generated by the gas pressure of the pressurized gas in the enclosure along the axial direction.

18. The gas-insulated switchgear according to claim 9, wherein the rope element of the gas-insulated line is configured to act as a long tension spring.

19. The gas-insulated switchgear according to claim 9, wherein the rope element has an axial stiffness that is configured such that a force generated by the pressurized insulation gas is fully or at least partially compensated.

20. The gas-insulated line according to claim 1, wherein the first attachment comprises a first flange of the enclosure and the second attachment comprises a second flange of the enclosure; and wherein the rope element traverses through a part of the first attachment and the second attachment.

21. The gas-insulated line according to claim 1, wherein the rope element is a first rope element loaded with a portion of the pretension; wherein the gas-insulated line further comprises:

a second rope element fixed between a third attachment point and a fourth attachment point and loaded with another portion of the pretension, wherein the second rope element is arranged outside of the enclosure and opposite to the first rope element outside of the enclosure.

* * * * *